US010826040B2

United States Patent
Kim et al.

(10) Patent No.: US 10,826,040 B2
(45) Date of Patent: Nov. 3, 2020

(54) SEPARATOR FOR RECHARGEABLE LITHIUM BATTERY AND RECHARGEABLE LITHIUM BATTERY INCLUDING THE SAME

(71) Applicant: SAMSUNG SDI CO., LTD., Yongin-si, Gyeonggi-do (KR)

(72) Inventors: Hyung-Bae Kim, Yongin-si (KR); Jong-Hwan Park, Yongin-si (KR); Byeong-Gyu Cho, Yongin-si (KR); Eun-Gyeong Lee, Yongin-si (KR); Jin-Hyuk In, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 185 days.

(21) Appl. No.: 14/923,382

(22) Filed: Oct. 26, 2015

(65) Prior Publication Data
US 2016/0149188 A1  May 26, 2016

(30) Foreign Application Priority Data

Nov. 21, 2014 (KR) .......................... 10-2014-0163793

(51) Int. Cl.
*H01M 2/16* (2006.01)
*H01M 10/052* (2010.01)

(52) U.S. Cl.
CPC ......... *H01M 2/1686* (2013.01); *H01M 2/166* (2013.01); *H01M 10/052* (2013.01)

(58) Field of Classification Search
CPC ................................................. H01M 2/166
See application file for complete search history.

(56) References Cited

U.S. PATENT DOCUMENTS

| | | | |
|---|---|---|---|
| 8,513,349 B2 | 8/2013 | Ootsuka et al. | |
| 2005/0191550 A1* | 9/2005 | Satoh | H01M 4/133 429/217 |
| 2007/0264577 A1* | 11/2007 | Katayama | H01M 2/162 429/246 |
| 2010/0140554 A1* | 6/2010 | Oki | H01M 4/131 252/500 |
| 2011/0195294 A1* | 8/2011 | Lee | H01M 2/145 429/144 |
| 2011/0212357 A1* | 9/2011 | Umehara | H01M 2/16 429/144 |
| 2011/0256443 A1* | 10/2011 | Park | H01M 2/162 429/145 |

(Continued)

FOREIGN PATENT DOCUMENTS

KR 10-2004-0078927 A 9/2004
KR 10-2012-0006667 A 1/2012

(Continued)

*Primary Examiner* — Brian R Ohara
(74) *Attorney, Agent, or Firm* — Lewis Roca Rothgerber Christie LLP (57) ABSTRACT

A separator for a rechargeable lithium battery includes a substrate; and a coating layer positioned on at least one side of the substrate, wherein a thickness ratio of the coating layer relative to the total thickness of the substrate and the coating layer ranges from about 5% to about 50%, and a loading level of the coating layer ranges from about 1.4 g/m² to about 9.8 g/m², and a rechargeable lithium battery including the same is provided.

11 Claims, 2 Drawing Sheets

(56) References Cited

U.S. PATENT DOCUMENTS

| | | | | |
|---|---|---|---|---|
| 2011/0305941 | A1* | 12/2011 | Park | H01M 2/162 |
| | | | | 429/145 |
| 2013/0089794 | A1* | 4/2013 | Kim | H01M 2/16 |
| | | | | 429/342 |
| 2013/0149587 | A1* | 6/2013 | Yu | H01M 2/145 |
| | | | | 429/144 |
| 2014/0160549 | A1* | 6/2014 | Sandberg | H01M 6/181 |
| | | | | 359/265 |
| 2015/0111086 | A1* | 4/2015 | Arnold | H01M 2/1686 |
| | | | | 429/144 |

FOREIGN PATENT DOCUMENTS

| | | |
|---|---|---|
| KR | 10-1148564 B1 | 5/2012 |
| KR | 10-2014-0091107 A | 7/2014 |

* cited by examiner

SEPARATOR FOR RECHARGEABLE LITHIUM BATTERY AND RECHARGEABLE LITHIUM BATTERY INCLUDING THE SAME

CROSS-REFERENCE TO RELATED APPLICATION

This application claims priority to and the benefit of Korean Patent Application No. 10-2014-0163793, filed in the Korean Intellectual Property Office on Nov. 21, 2014, the entire content of which is incorporated herein by reference.

BACKGROUND

1. Field

A separator for a rechargeable lithium battery and a rechargeable lithium battery including the same are disclosed.

2. Description of the Related Art

A rechargeable lithium battery includes a positive electrode, a negative electrode and a separator interposed between the positive and negative electrodes. The separator includes micropores, and the micropores play a role of electrically insulating the positive and negative electrodes as well as provide a movement passage for lithium ions. In addition, the separator shuts down the battery when the battery temperature goes over a set or predetermined temperature and thus, plays a role of preventing the battery from being overheated.

Due to the recent demand for high power/large capacity batteries for electric vehicles, the separator is required to be thinner and lighter, and simultaneously, have excellent thermal shape stability to produce a high-capacity battery.

For this purpose, a separator obtained by coating a binder resin and a ceramic particle on a porous substrate is mainly used (utilized). However, the separator is contracted (e.g., shrank) when the battery is overheated, and thus, may hardly meet the thermal stability requirement.

SUMMARY

An aspect according to one embodiment of the present invention is directed towards a separator for a rechargeable lithium battery having improved thermal safety.

Another aspect according to one embodiment of the present invention is directed towards a rechargeable lithium battery including the separator for a rechargeable lithium battery.

According to one embodiment of the present invention, a separator for a rechargeable lithium battery includes a substrate; and a coating layer on at least one side of the substrate, wherein a thickness ratio of the thickness of the coating layer to the total thickness of the substrate and the coating layer may be from about 5% to about 50%, and a loading level of the coating layer may be from about 1.4 g/m² to about 9.8 g/m².

The thickness ratio of the thickness of the coating layer to the total thickness of the substrate and the coating layer may be from about 15% to about 45%.

The loading level of the coating layer may be from about 2.5 g/m² to about 5.0 g/m².

The coating layer may have a thickness of about 1 μm to about 7 μm.

The coating layer may include two or more kinds of inorganic particles having different particle diameters from each other.

The inorganic particles may have an average particle diameter (D50) of about 0.1 μm to about 5 μm.

The inorganic particles may include a first particle and a second particle having a smaller average particle diameter than the first particle, the first particle may be included in a larger amount than the second particle, and in one embodiment, a weight ratio of the first particle and the second particle may be from about 9.5:0.5 to about 6:4.

The inorganic particles may include $SiO_2$, $Al_2O_3$, $Al(OH)_3$, $AlO(OH)$, $TiO_2$, $BaTiO_2$, $ZnO_2$, $Mg(OH)_2$, MgO, $Ti(OH)_4$, aluminum nitride (AlN), silicon carbide (SiC), boron nitride (BoN), clay, a glass powder, or a combination thereof.

The coating layer may further include a binder, the binder may include a polyacrylic acid-based compound, and the polyacrylic acid-based compound may include poly(meth)acrylic acid, a poly(meth)acrylate salt, or a combination thereof.

The inorganic particles may be included in an amount of about 70 to about 96 wt % based on the total amount of the inorganic particles and the binder.

The coating layer may further include a dispersing agent, and the dispersing agent may include an acryl-based compound.

The dispersing agent may be included in an amount of about 0.1 to about 5 parts by weight based on 100 parts by weight of the inorganic particles.

According to another embodiment of the present invention, a rechargeable lithium battery includes the separator.

Other example embodiments are included in the following detailed description.

The separator may realize a rechargeable lithium battery having improved thermal safety.

DETAILED DESCRIPTION

Hereinafter, embodiments are described in more detail. However, these embodiments are exemplary, and this disclosure is not limited thereto. Expressions such as "at least one of," when preceding a list of elements, modify the entire list of elements and do not modify the individual elements of the list. Further, the use of "may" when describing embodiments of the present invention refers to "one or more embodiments of the present invention." Also, the term "exemplary" is intended to refer to an example or illustration. It will be understood that when an element or layer is referred to as being "on", "connected to", "coupled to", or "adjacent to" another element or layer, it can be directly on, connected to, coupled to, or adjacent to the other element or layer, or one or more intervening elements or layers may be present. In contrast, when an element or layer is referred to as being "directly on," "directly connected to", "directly coupled to", or "immediately adjacent to" another element or layer, there are no intervening elements or layers present. As used herein, the term "substantially," "about," and similar terms are used as terms of approximation and not as terms of degree, and are intended to account for the inherent deviations in measured or calculated values that would be recognized by those of ordinary skill in the art. Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 1 12, first paragraph, and 35 U.S.C. § 132(a).

Hereinafter, a separator for a rechargeable lithium battery according to one embodiment is described.

The separator for a rechargeable lithium battery according to one embodiment separates a negative electrode from a positive electrode and provides transfer passages for lithium ions, and includes a substrate and a coating layer positioned on at least one side of the substrate.

The substrate may have a porous structure including pores. Lithium ions are transferred through the pores. The substrate may use (utilize) polyolefin (such as polyethylene, polypropylene, or the like), polyester, polytetrafluoroethylene (PTFE), a glass fiber, or a combination thereof. The substrate may be a non-woven fabric or a woven fabric. The substrate may have a single layer structure or a multilayer structure. For example, the substrate may be a polyethylene single layer, a polypropylene single layer, a polyethylene/polypropylene double layer, a polypropylene/polyethylene/polypropylene triple layer, a polyethylene/polypropylene/polyethylene triple layer, or the like. The substrate may have a thickness of about 1 µm to about 40 µm, and for example, about 1 µm to about 30 µm, about 1 µm to about 20 µm, about 5 µm to about 15 µm, or about 5 µm to about 10 µm. When the substrate has a thickness within the above ranges, a short circuit between the positive and negative electrodes may be prevented, while the internal resistance of the battery is not increased.

The coating layer may include inorganic particles. The inorganic particles may include at least two kinds of inorganic particles having different particle diameters from each other. When at least two kinds of inorganic particles having different particle diameters from each other are used (utilized) to form the coating layer, a short circuit between the positive and negative electrodes may be suppressed by reducing or preventing thermal contraction of the separator, and battery performance may be improved by reducing or minimizing resistance of lithium ions.

The inorganic particles may have an average particle diameter (D50) of about 0.1 µm to about 5 µm, for example, about 0.2 µm to about 3 µm. Within the average particle diameter range, at least two inorganic particles (e.g., two kinds of inorganic particles, each including a plurality of inorganic particles) having a different particle diameter from each other may be mixed. In one embodiment, the inorganic particles may include a first particle (e.g., a first kind of particles including a plurality of particles having a first average particle diameter (D50)) and a second particle (e.g., a second kind of particles including a plurality of particles having a second average particle diameter (D50)) having a smaller particle diameter (e.g., average particle diameter) than the first particle. When the inorganic particles having relatively large and small sizes are mixed, a separator having improved heat resistance may be secured. For example, the large and small particles are distinguished with reference to a particle size of about 0.5 µm within an average particle diameter (D50) ranging from about 0.1 µm to about 5 µm. That is, the relatively larger particle, i.e., the first particle, may have an average particle diameter (D50) of greater than or equal to about 0.5 µm and less than or equal to about 5 µm, for example, greater than or equal to about 0.6 µm and less than or equal to about 3 µm; and the relatively smaller particle, i.e., the second particle, may have an average particle diameter (D50) of greater than or equal to about 0.1 µm and less than about 0.5 µm, for example, greater than or equal to about 0.2 µm and less than about 0.4 µm.

In one embodiment, the first particle may be mixed in a larger amount than the second particle. In one embodiment, the first particle and the second particle may be mixed in a weight ratio of about 9.5:0.5 to about 6:4, for example, about 9:1 to about 7:3. When the inorganic particles having larger and smaller particle diameters are mixed within the above weight ratio ranges, stability and reliability may be secured by reducing or minimizing the moisture content of a separator, and simultaneously, thermal stability may be improved by reducing or preventing contraction and rupture of a separator and thus, reducing or preventing ignition and explosion of the separator at a high temperature.

The inorganic particle may include $SiO_2$, $Al_2O_3$, $Al(OH)_3$, $AlO(OH)$, $TiO_2$, $BaTiO_2$, $ZnO_2$, $Mg(OH)_2$, $MgO$, $Ti(OH)_4$, aluminum nitride (AlN), silicon carbide (SiC), boron nitride (BoN), clay, a glass powder, or a combination thereof, and for example, $AlO(OH)$ may be used (utilized).

In addition, the moisture content of the separator may be adjusted by controlling the thickness of the coating layer relative to the substrate and the loading level of the coating layer, and thus, thermal stability may be improved.

The thickness of the coating layer relative to the substrate and the loading level of the coating layer may be adjusted in a method of forming the coating layer, for example, by adjusting the coating layer composition or the like. In one embodiment, at least two kinds of inorganic particles having different particle diameters from each other and specifically, large and small particles are used (utilized) within the weight ratio range described above to adjust the thickness of the coating layer relative to the substrate and the loading level of the coating layer. As a result, the moisture content of the separator may be reduced or minimized, and simultaneously, the shape of the separator may be maintained without being melted down, thereby realizing excellent cycle-life characteristics of a battery.

In one embodiment, a thickness ratio of the thickness of the coating layer relative to the total thickness of the substrate and the coating layer (i.e., the sum of the thickness of the substrate and that of the coating layer) may be about 5% to about 50%, for example, about 15% to about 45%, or about 30% to about 35%. When the coating layer has a thickness ratio relative to the substrate within the above ranges, the moisture content of a separator may be reduced or minimized, and simultaneously, excellent thermal stability may be secured.

The coating layer may have a thickness of about 1 µm to about 7 µm, for example, about 2 µm to about 6 µm, or about 4 µm to about 5 µm. When the coating layer has a thickness within the above ranges, a separator having the coating layer does not only have excellent adherence to an electrode plate but also reduced or minimized thermal contraction and thus, may realize a rechargeable lithium battery having excellent thermal safety.

In addition, a loading level of the coating layer may be about 1.4 $g/m^2$ to about 9.8 $g/m^2$, for example, about 2.0 $g/m^2$ to about 7 $g/m^2$, about 2.5 $g/m^2$ to about 5.0 $g/m^2$, or about 3.0 $g/m^2$ to about 3.5 $g/m^2$. When the loading level of the coating layer is within the above ranges, the moisture content of a separator may be reduced or minimized, and simultaneously (also), excellent thermal stability may be secured. The loading level refers to the weight of the coating layer per unit area of the substrate.

The coating layer may further include a binder. When the binder is used (utilized) with the above inorganic particles, a separator may be further reduced or prevented from thermal contraction, and its adherence to an electrode plate may be improved.

The binder may include a polyacrylic acid-based compound. The polyacrylic acid-based compound may include poly(meth)acrylic acid, a poly(meth)acrylate salt, or a combination thereof. Examples of the poly(meth)acrylic acid may be polyacrylic acid, polymethacrylic acid, and a combination thereof. Examples of the poly(meth)acrylate salt may be a salt compound of polyacrylic acid, polymethacrylic acid, and a combination thereof. Herein, the poly(meth)acrylate salt may be a salt compound including an alkali metal, an alkaline-earth metal, ammonium, an amine salt, and a combination thereof. Examples of the poly(meth) acrylate salt may be a sodium polyacrylate, a sodium polymethacrylate, a magnesium polyacrylate, a magnesium polymethacrylate, an ammonium polyacrylate, an ammonium polymethacrylate, and the like, but are not limited thereto.

The polyacrylic acid-based compound may have a viscosity of about 500 cps to about 10,000 cps, for example, about 3,000 cps to about 6,000 cps. When the polyacrylic acid-based compound has a viscosity within the above ranges, heat resistance of a separator is improved, and thus, its excellent thermal stability may be secured. The viscosity may be measured by using (utilizing) a reference solvent of a mineral oil (KS1000 & 5000) as a standard solution for calibrating a viscometer.

The binder may further include a styrene-butadiene rubber (SBR), carboxylmethyl cellulose (CMC), ethylene vinylacetate (EVA), hydroxyethyl cellulose (HEC), polyvinyl alcohol (PVA), polyvinylbutyral (PVB), an ethylene-acrylic acid copolymer, acrylonitrile, vinyl acetate derivative, polyethylene glycol, an acryl-based rubber, or a combination thereof, besides the polyacrylic acid-based compound.

The inorganic particles may be included in an amount of about 70 to about 96 wt %, for example, about 80 to about 96 wt %, about 90 to about 96 wt %, or about 93 to about 95 wt %, based on the total amount of the inorganic particles and the binder. When the inorganic particles are used (utilized) within the above ranges, the moisture content of a separator may be reduced or minimized, and simultaneously, thermal contraction of the separator at a high temperature is reduced or prevented, thus obtaining excellent thermal stability.

The coating layer may further include a dispersing agent to increase dispersion of the inorganic particles into water.

The dispersing agent may use (utilize) an acryl-based compound. Herein, the acryl-based compound may be different from the polyacrylic acid-based compound used (utilized) as a binder above.

The dispersing agent may be included in an amount of about 0.1 to about 5 parts by weight, for example, about 0.1 to about 1 part by weight, based on 100 parts by weight of the inorganic particles. When the dispersing agent is used (utilized) within the above ranges, the inorganic particles are uniformly dispersed in the coating layer, and thus, a separator having excellent thermal stability may be secured.

The coating layer is formed by coating a composition including the inorganic particles, the binder, the dispersing agent, and deionized water on at least one side of the substrate and drying it.

The coating composition may be coated on the substrate using (utilizing) a dip coating method, a die coating method, a roll coating method, a comma coating method, or the like, without being limited thereto.

The drying may include drying using (utilizing) warm air, hot air, or low humid air, or vacuum-drying, but the present invention is not limited thereto.

Hereinafter, a rechargeable lithium battery including the separator is described referring to FIG. 1.

Figure 1:
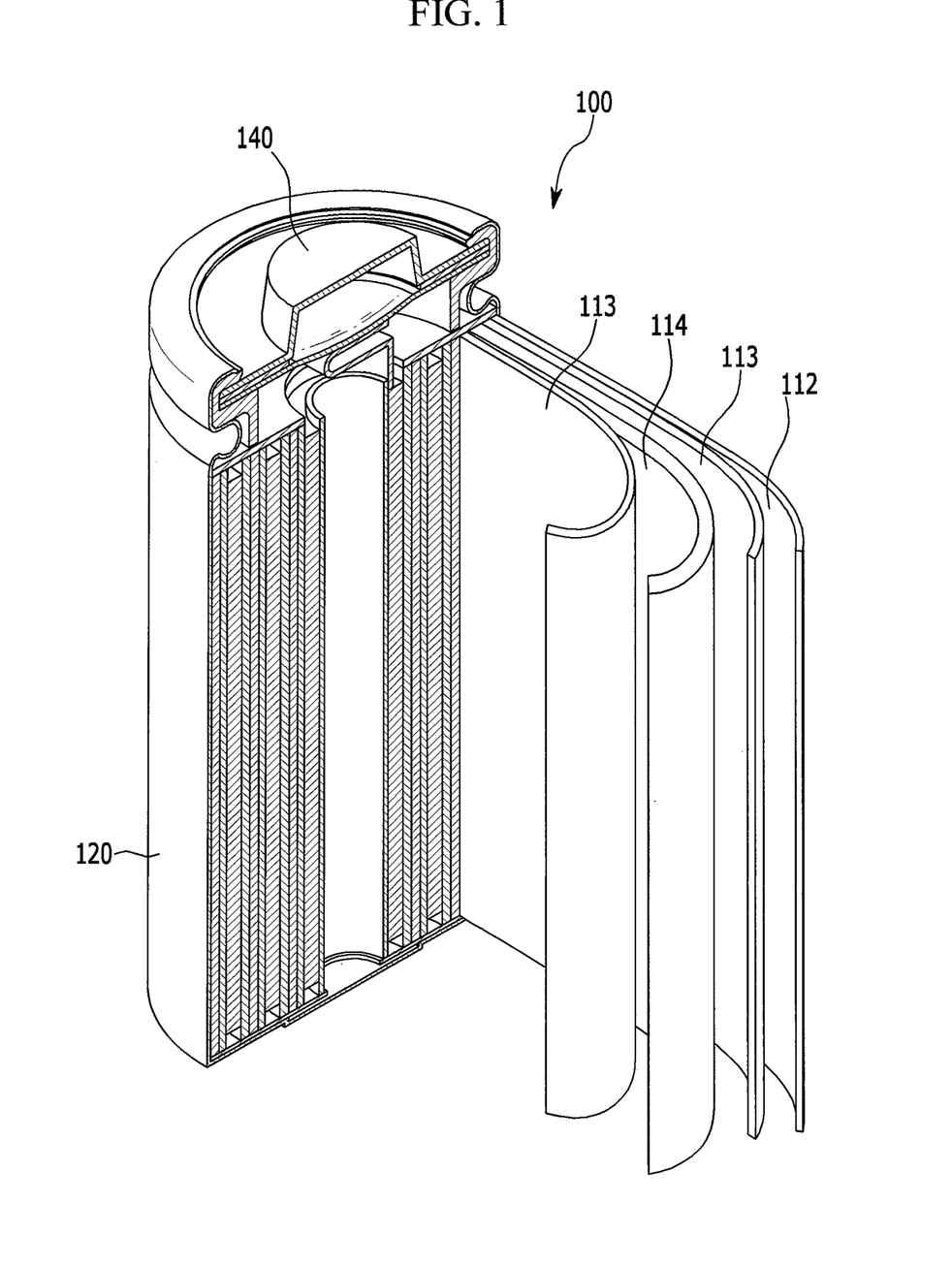
FIG. 1 is a schematic view showing a rechargeable lithium battery according to one embodiment.

FIG. 1 is a schematic view showing a rechargeable lithium battery according to one embodiment.

Referring to FIG. 1, a rechargeable lithium battery 100 according to one embodiment includes an electrode assembly including a positive electrode 114, a negative electrode 112 facing the positive electrode 114, a separator 113 interposed between the negative electrode 112 and the positive electrode 114, an electrolyte solution impregnating the positive electrode 114, the negative electrode 112, and the separator 113, a battery case 120 housing the electrode assembly, and a sealing member 140 sealing the battery case 120.

The separator 113 is the same as described above.

The positive electrode 114 includes a current collector and a positive active material layer formed on the current collector.

The current collector may use (utilize) aluminum, but is not limited thereto.

The positive active material layer includes a positive active material.

The positive active material may be a compound (lithiated intercalation compound) being capable of intercalating and deintercallating lithium, and in one embodiment, a lithium metal oxide.

The lithium metal oxide may, in one embodiment, include lithium and at least one metal selected from cobalt, manganese, nickel and aluminum. In one embodiment, compounds represented by one of the following chemical formulae may be used (utilized).

$Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{1-b}X_bO_{2-c}D_c$ ($0.90 \leq a \leq 1.8$, $0 \leq b \leq 0.5$, $0 \leq c \leq 0.05$); $Li_aE_{2-b}X_bO_{4-c}D_c$ ($0.90 \leq a \leq 1.8$, $0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_{1-b-c}Mn_bX_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_cO_{2-\alpha}O_2$ ($0.90 \leq a \leq 1.8$, $0 \leq b \leq 0.5$, $0 \leq c \leq 0.05$, $0 < \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$);

$QO_2$; $QS_2$; $LiQS_2$; $V_2O_5$; $LiV_2O_5$; $LiZO_2$; $LiNiVO_4$; $Li_{(3-f)}O_2(PO_4)_3$ (0≤f≤2); $Li_{(3-f)}Fe_2(PO_4)_3$ (0≤f≤2); and $LiFePO_4$ In the chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The lithium metal oxide may be, in one embodiment, a lithium nickel cobalt manganese oxide, a lithium nickel cobalt aluminum oxide, or a combination thereof, and for example, a mixture of the lithium nickel cobalt manganese oxide and the lithium nickel cobalt aluminum oxide may be used (utilized).

Besides the positive active material, the positive active material layer includes a binder and a conductive material.

The binder improves binding properties of the positive active material particles to each other and to a current collector. Examples of the binder include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material provides an electrode with conductivity. Any suitable electrically conductive material may be used (utilized) as a conductive material unless it causes a chemical change. Examples of the conductive material include a carbon-based material (such as natural graphite, artificial graphite, carbon black, acetylene black, ketjen black, carbon fiber, or the like); a metal-based material (such as a metal powder, a metal fiber, or the like of copper, nickel, aluminum, silver, or the like); a conductive polymer (such as a polyphenylene derivative or the like); and a mixture thereof.

The negative electrode 112 includes a current collector and a negative active material layer disposed on the current collector.

The current collector may be a copper foil, but is not limited thereto.

The negative active material layer includes a negative active material, a binder, and optionally, a conductive material.

The negative active material may include a material that reversibly intercalates/deintercalates lithium ions, a lithium metal, a lithium metal alloy, a material capable of doping and dedoping lithium, or a transition metal oxide.

The material that can reversibly intercalate/deintercalate lithium ions may include a carbon material. The carbon material may be any generally-used (utilized) carbon-based negative active material in a lithium ion rechargeable battery. Examples of the carbon material include crystalline carbon, amorphous carbon, and mixtures thereof. The crystalline carbon may be non-shaped (e.g., irregularly shaped), or sheet, flake, spherical, or fiber shaped natural graphite or artificial graphite. The amorphous carbon may be a soft carbon (carbon fired at a low temperature), a hard carbon, a mesophase pitch carbonization product, fired coke, or the like.

Examples of the lithium metal alloy include lithium and a metal selected from Na, K, Rb, Cs, Fr, Be, Mg, Ca, Sr, Si, Sb, Pb, In, Zn, Ba, Ra, Ge, Al, and Sn.

The material being capable of doping/dedoping lithium may include Si, $SiO_x$ (0<x<2), a Si—C composite, a Si-Q alloy (wherein Q is an alkali metal, an alkaline-earth metal, Group 13 to Group 16 elements, a transition metal, a rare earth element, or a combination thereof, but not Si), Sn, $SnO_2$, a Sn—C composite, Sn—R (wherein R is an alkali metal, an alkaline-earth metal, Group 13 to Group 16 elements, a transition metal, a rare earth element, or a combination thereof, but not Sn), or the like. At least one of these materials may be mixed with $SiO_2$. The elements Q and R may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

The transition metal oxide may include vanadium oxide, lithium vanadium oxide, or the like.

The binder improves binding properties of the negative active material particles with one another and with a current collector. Examples of the binder include polyvinylalcohol, carboxylmethylcellulose, hydroxypropylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to improve electrode conductivity. Any suitable electrically conductive material may be used (utilized) as a conductive material unless it causes a chemical change. Examples of the conductive material include a carbon-based material (such as natural graphite, artificial graphite, carbon black, acetylene black, ketjen black, a carbon fiber, or the like); a metal-based material (such as a metal powder, a metal fiber, or the like of copper, nickel, aluminum, silver, or the like); a conductive polymer (such as a polyphenylene derivative); and a mixture thereof.

The negative electrode may be manufactured by mixing the negative active material, the binder and the conductive material in a solvent to prepare a negative active material composition, and coating the negative active material composition on the current collector. Herein, the solvent may be N-methylpyrrolidone, or the like, and an aqueous solvent such as water or the like may be used (utilized) according to the kind of the binder, but is not limited thereto.

The electrolyte solution includes a non-aqueous organic solvent and a lithium salt.

The non-aqueous organic solvent serves as a medium for transmitting ions taking part in the electrochemical reaction of a battery. The non-aqueous organic solvent may be selected from a carbonate-based, ester-based, ether-based, ketone-based, alcohol-based and aprotic solvent.

The carbonate-based solvent may be, for example, dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), or the like.

In one embodiment, when the carbonate-based solvent is prepared by mixing a cyclic carbonate and a linear carbonate, a solvent having a low viscosity while having an increased dielectric constant may be obtained. The cyclic carbonate and the linear carbonate may be mixed together in the volume ratio of about 1:1 to 1:9.

The ester-based solvent may include, for example, methyl acetate, ethyl acetate, n-propyl acetate, dimethyl acetate, methyl propionate, ethyl propionate, γ-butyrolactone, decanolide, valerolactone, mevalonolactone, caprolactone, or the like. The ether-based solvent may include, for example, dibutylether, tetraglyme, diglyme, dimethoxyethane, 2-methyltetrahydrofuran, tetrahydrofuran, or the like. The ketone-based solvent may include cyclohexanone, or the like. The alcohol-based solvent may include ethanol, isopropyl alcohol, or the like.

The non-aqueous organic solvent may be used (utilized) singularly or in a mixture. When the organic solvent is used (utilized) in a mixture, the mixture ratio can be controlled in accordance with a desirable battery performance.

The non-aqueous electrolyte solution may further include an overcharge-inhibiting additive such as ethylene carbonate, pyrocarbonate, or the like.

The lithium salt dissolved in the non-aqueous organic solvent supplies lithium ions in the battery, and operates a basic operation of a rechargeable lithium battery and improves lithium ion transportation between the positive and negative electrodes.

Examples of the lithium salt may include one selected from $LiPF_6$, $LiBF_4$, $LiSbF_6$, $LiAsF_6$, $LiN(SO_3C_2F_6)_2$, $LiC_4F_9SO_3$, $LiClO_4$, $LiAlO_2$, $LiAlCl_4$, $LiN(C_xF_{2x+1}SO_2)$ $(C_yF_{2y+1}SO_2)$ (wherein x and y are natural numbers), LiCl, LiI, $LiB(C_2O_4)_2$ (lithium bis(oxalato)borate; LiBOB), and a combination thereof.

The lithium salt may be used (utilized) at a concentration ranging from about 0.1 M to about 2.0 M. When the lithium salt is included at the above concentration range, an electrolyte solution may have excellent performance and lithium ion mobility due to appropriate conductivity and viscosity of an electrolyte solution.

Hereinafter, the embodiments are illustrated in more detail with reference to examples. However, these examples are exemplary, and the present disclosure is not limited thereto. Furthermore, what is not described in this disclosure may be sufficiently understood by those who have knowledge in this field and will not be illustrated here.

Manufacture of Separator

EXAMPLE 1

An inorganic solution was prepared by mixing 45.5 wt % of a mixture of AlO(OH) having an average particle diameter (D50) of 1.5 μm and AlO(OH) having an average particle diameter (D50) of 0.3 μm in a weight ratio of 9:1 as the inorganic particles, 0.5 wt % of a dispersing agent containing 40% of a nonvolatile component (CERASPERSE 5468CF, SAN NOPCO Ltd.), and 54 wt % of distilled water with a beadmill. In addition, a binder solution was prepared by mixing 4.9 wt % of polyvinyl alcohol (PVA217, KURARAY Inc.) and 95.1 wt % of distilled water. Then, 61.7 wt % of the inorganic solution and 38.3 wt % of the binder solution were mixed to prepare a slurry.

The slurry was coated on one side of a 11 μm-thick single polyethylene film to form a 3 μm-thick coating layer, thereby complete the manufacturing of a separator.

EXAMPLE 2

A separator was manufactured according to the same method as Example 1 except for preparing an inorganic solution by using (utilizing) a mixture of AlO(OH) having an average particle diameter (D50) of 1.5 μm and AlO(OH) having an average particle diameter (D50) of 0.3 μm in a weight ratio of 8:2 as the inorganic particles.

EXAMPLE 3

A separator was manufactured according to the same method as Example 1 except for preparing an inorganic solution by using (utilizing) a mixture of AlO(OH) having an average particle diameter (D50) of 1.5 μm and AlO(OH) having an average particle diameter (D50) of 0.3 μm in a weight ratio of 7:3 as the inorganic particles.

COMPARATIVE EXAMPLE 1

A separator was manufactured according to the same method as Example 1 except for preparing an inorganic solution by mixing 45.5 wt % of AlO(OH) having an average particle diameter (D50) of 0.3 μm, 0.5 wt % of a dispersing agent, and 54 wt % of distilled water with a beadmill.

COMPARATIVE EXAMPLE 2

A separator was manufactured according to the same method as Example 1 except for preparing an inorganic solution by mixing 45.5 wt % of AlO(OH) having an average particle diameter (D50) of 1.5 μm, 0.5 wt % of a dispersing agent, and 54 wt % of distilled water with a beadmill.

(Manufacture of Rechargeable Lithium Battery Cell)

$LiCoO_2$, polyvinylidene fluoride and carbon black in a weight ratio of 97:1.5:1.5 were added to an N-methylpyrrolidone (NMP) solvent to prepare a slurry. The slurry was coated on an aluminum (Al) thin film and then, dried and compressed, thereby complete the manufacturing of a positive electrode.

On the other hand, graphite, styrene-butadiene rubber and carbon black in a weight ratio of 98:1:1 were added to an N-methylpyrrolidone (NMP) solvent to prepare a slurry. The slurry was coated on a copper foil and then, dried and compressed, thereby complete the manufacturing of a negative electrode.

An electrolyte solution was prepared by mixing ethylene carbonate (EC), ethylmethyl carbonate (EMC) and diethyl carbonate (DEC) in a volume ratio of 3:5:2, and adding 1 M $LiPF_6$ to the mixed solvent.

The positive electrode, the negative electrode and the electrolyte solution were used (utilized) with each separator according to Examples 1 to 3 and Comparative Examples 1 and 2, thereby complete the manufacturing of a rechargeable lithium battery cell.

Evaluation 1: Moisture Content of Separator

A moisture content included in the coating layer of each separator according to Examples 1 to 3 and Comparative Examples 1 and 2 was measured, and the result is provided in the following Table 1.

The moisture content was measured by using (utilizing) Karl Fischer 860 KF thermoprep and 831 KF coulometer. A separation membrane was put in a vial and fixed on the moisture meter (thermoprep), and its moisture content was measured while the separator was maintained at 150° C. for 600 seconds and then, the result is converted into ppm. However, the moisture content was measured even after 600 seconds until it came down to less than or equal to 3 ug/min.

Evaluation 2: Air Permeability of Separator

Air permeability of the separators according to Examples 1 to 3 and Comparative Examples 1 and 2 was measured utilizing the following method, and the results are provided in the following Table 1.

Each separator was cut into a size of 6 cm×6 cm, and its air permeability was measured by using (utilizing) a Gurley densometer. The air permeability was obtained by injecting 100 cc of air with a set or predetermined pressure and measuring how long it took for the air to completely pass pores of the separator.

Evaluation 3: Rupture Test of Separator

A rupture test about the separators according to Examples 1 to 3 and Comparative Examples 1 and 2 was performed, and the results are provided in the following Table 1.

A 5 cm×5 cm of each separator was fixed in a paper frame with an imide tape, then, put in an oven, heated up to 230° C., and maintained for 10 minutes, and then, the shape of the separator was examined. Herein, when the separator maintained its shape, it was classified as PASS, while when the separator was contracted or broken, it was classified as FAIL, and data in the following Table shows the number of FAIL samples/the number of tested samples.

TABLE 1

| | Substrate thickness (μm) | Coating layer thickness (μm) | Thickness ratio (%) | Loading level of coating layer (g/m$^2$) | Moisture content (ppm) | Air permeability (sec/0.1 L) | Rupture test |
|---|---|---|---|---|---|---|---|
| Ex. 1 | 11 | 3 | 21.4 | 3.4 | 320 | 141 | 0/5 |
| Ex. 2 | 11 | 3 | 21.4 | 3.3 | 371 | 138 | 0/5 |
| Ex. 3 | 11 | 3 | 21.4 | 3.3 | 662 | 127 | 0/5 |
| Comp. Ex. 1 | 13.5 | 0.5 | 3.57 | 0.8 | 1211 | 110 | 5/5 |
| Comp. Ex. 2 | 6 | 8 | 57.1 | 10.2 | 290 | 148 | 2/5 |

In Table 1, a thickness ratio (%) was obtained as a percentage of the thickness of a coating layer relative to the total thickness of the coating layer and a substrate.

Referring to Table 1, the separators including a coating layer formed by mixing two or more kinds of inorganic particles having different particle diameters from each other in an appropriate ratio according to Examples 1 to 3 showed a thickness ratio of the coating layer relative to a substrate and the loading level of the coating layer within an appropriate range compared with the separators according to Comparative Examples 1 and 2. Herein, the separators of Examples 1 to 3 showed a small moisture content and excellent air permeability compared with the separators of Comparative Examples 1 and 2 and also, were neither contracted nor broken at high temperature and thus, may realize a rechargeable lithium battery having excellent thermal stability.

Evaluation 4: Cycle-life Characteristics of Rechargeable Lithium Battery Cell

Figure 2:
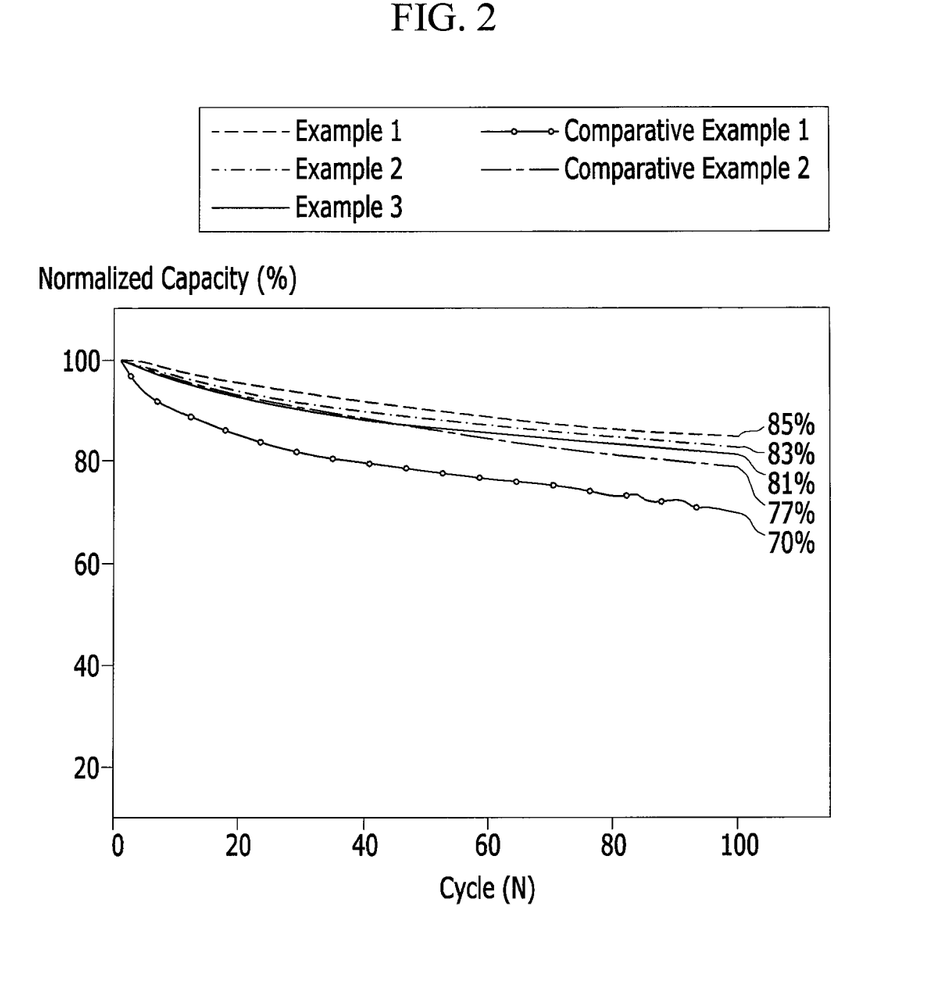
FIG. 2 is a graph showing cycle-life characteristics of the rechargeable lithium battery cells according to Examples 1 to 3 and Comparative Examples 1 and 2 as a function of the cycle repetition.

Rechargeable lithium battery cells of Examples 1 to 3 and Comparative Examples 1 and 2 were charged and discharged under the following charge and discharge condition, and their cycle-life characteristics were evaluated, and the results are provided in FIG. 2.

The charge was performed in a CC-CV mode at 4.2 V, 0.5 C, and 0.05 C of a current cut-off, and the discharge was performed in a CC-mode at 3.0 V, and 0.5 C, and the charge and discharge were repeated 100 times.

FIG. 2 is a graph showing cycle-life characteristics of the rechargeable lithium battery cells of Examples 1 to 3 and Comparative Examples 1 and 2 as a function of the repetitive cycle.

Referring to FIG. 2, Examples 1 to 3 (each using (utilizing) a mixture of two or more kinds of inorganic particles having different particle diameters from each other with an appropriate ratio to form a coating layer for a separator and thus, having a thickness ratio of the coating layer relative to a substrate and a loading level of the coating layer within an appropriate range) showed excellent cycle-life characteristics compared with Comparative Examples 1 and 2 (each using (utilizing) one kind of inorganic particles).

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

DESCRIPTION OF SYMBOLS

100: rechargeable lithium battery
112: negative electrode
113: separator
114: positive electrode
120: battery case
140: sealing member

What is claimed is:

1. A separator for a rechargeable lithium battery comprising:
    a substrate; and
    a coating layer on at least one side of the substrate,
    wherein a thickness ratio of a thickness of the coating layer to a total thickness of the substrate and the coating layer is from about 30% to about 35%,
    a loading level of the coating layer is from 3.3 g/m$^2$ to 3.5 g/m$^2$,
    wherein the coating layer is formed: from a coating composition consisting of a binder, a solvent and inorganic particles or a coating composition consisting of a binder, a dispersing agent, a solvent and inorganic particles, and
    wherein the inorganic particles are selected from the group consisting of Al(OH)$_3$, AlO(OH), Ti(OH)$_4$, boron nitride (BN), and a combination thereof,
    the inorganic particles include a first particle having a first average particle diameter (D50) greater than or equal to 0.6 μm and less than or equal to 3 μm and a second particle having a second average particle diameter (D50) greater than or equal to 0.1 μm and less than 0.5 μm, and
    a weight ratio of the first particle and the second particle is from 9:1 to 8:2.

2. The separator of claim 1, wherein the coating layer has a thickness of about 1 μm to about 7 μm.

3. The separator of claim 1, wherein the inorganic particles have an average particle diameter (D50) of about 0.1 μm to about 5 μm.

4. The separator of claim 1, wherein the binder comprises a polyacrylic acid-based compound, and
the polyacrylic acid-based compound comprises poly(meth)acrylic acid, a poly(meth)acrylate salt, or a combination thereof.

5. The separator of claim 1, wherein the inorganic particles are included in an amount of about 70 to about 96 wt% based on a total amount of the inorganic particles and the binder.

6. The separator of claim 1, wherein the coating layer further comprises the dispersing agent, and
the dispersing agent comprises an acryl-based compound.

7. The separator of claim 6, wherein the dispersing agent is included in an amount of about 0.1 to about 5 parts by weight based on 100 parts by weight of the inorganic particles.

8. A rechargeable lithium battery comprising the separator of claim 1.

9. The separator of claim 1, wherein the first particle and the second particle are made of a same material.

10. A separator for a rechargeable lithium battery comprising:
a substrate; and
a coating layer on at least one side of the substrate,
wherein a thickness ratio of a thickness of the coating layer to a total thickness of the substrate and the coating layer is from about 30% to about 35%,
a loading level of the coating layer is from 3.3 g/m$^2$ to 3.5 g/m$^2$,
wherein the coating layer is formed: from a coating composition consisting of a binder, a solvent and inorganic particles or a coating composition consisting of a binder, a dispersing agent, a solvent and inorganic particles,
wherein the inorganic particles are selected from the group consisting of $Al(OH)_3$, $AlO(OH)$, $ZnO_2$, $Ti(OH)_4$, silicon carbide (SiC), boron nitride (BN), a glass powder, and a combination thereof,
the inorganic particles comprise a first particle and a second particle having a smaller particle diameter than the first particle,
the first particle and the second particle are made of a same material, and
the first particle has a first average particle diameter (D50) greater than or equal to 0.6 μm and less than or equal to 3 μm and the second particle has a second average particle diameter (D50) greater than or equal to 0.1 μm and less than 0.5 μm, and
a weight ratio of the first particle and the second particle is from 9:1 to 8:2.

11. The separator of claim 1, wherein
the binder is selected from the group consisting of a polyacrylic acid-based compound, a styrene-butadiene rubber (SBR), carboxylmethyl cellulose (CMC), ethylene vinylacetate (EVA), hydroxyethyl cellulose (HEC), polyvinyl alcohol (PVA), polyvinylbutyral (PVB), an ethylene-acrylic acid copolymer, acrylonitrile, vinyl acetate derivative, polyethylene glycol, and a combination thereof, and
the polyacrylic acid-based compound is selected from the group consisting of poly(meth)acrylic acid, a poly(meth)acrylate salt, and a combination thereof.

* * * * *